US011184451B2

(12) United States Patent
Brunn et al.

(10) Patent No.: US 11,184,451 B2
(45) Date of Patent: *Nov. 23, 2021

(54) INTELLIGENTLY DELIVERING NOTIFICATIONS INCLUDING SUMMARY OF FOLLOWED CONTENT AND RELATED CONTENT

(71) Applicant: International Business Machines Corporation, Armonk, NY (US)

(72) Inventors: Jonathan F. Brunn, Logan, UT (US); Jennifer Heins, Raleigh, NC (US); Marc D. Labrecque, Chapel Hill, NC (US); Amy Widmer, Amsterdam (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,313

(22) Filed: Aug. 21, 2019

(65) Prior Publication Data
US 2019/0379753 A1   Dec. 12, 2019

Related U.S. Application Data (63) Continuation of application No. 15/398,203, filed on Jan. 4, 2017, now Pat. No. 10,469,607.

(51) Int. Cl.
*G06Q 10/10* (2012.01)
*H04L 29/08* (2006.01)
(Continued)

(52) U.S. Cl.
CPC .............. *H04L 67/26* (2013.01); *H04L 51/24* (2013.01); *H04L 51/26* (2013.01); *H04L 51/32* (2013.01); *G06Q 10/10* (2013.01); *G06Q 50/01* (2013.01)

(58) Field of Classification Search
CPC ......... H04L 67/26; H04L 51/04; H04L 51/24; H04L 51/26; H04L 51/32; H04L 65/4007; H04L 65/4015; G06Q 50/01
See application file for complete search history.

(56) References Cited

U.S. PATENT DOCUMENTS

| 8,639,662 B2 | 1/2014 | Chandhok et al. |
| 2009/0106617 A1* | 4/2009 | Katis ................. H04L 65/4053 714/748 |

(Continued)

OTHER PUBLICATIONS

Matthew Panzarino, "Your iOS 10 notifications will be a lot more useful and relevant. And gifs!," https://techcrunch.com/2016/06/15/our-ios-10-notifications-will-be-a-lot-more-useful-and-relevant, Jun. 15, 2016, pp. 1-9.

(Continued)

Primary Examiner — Emmanuel L Moise
Assistant Examiner — Xiang Yu
(74) Attorney, Agent, or Firm — Robert A. Voigt, Jr.; Winstead PC (57) ABSTRACT

A method, system and computer program product for handling notifications. A notification system monitors content (e.g., photograph) followed by a user for updates on a communication system. If the notification system identifies updates to content out of the monitored content, then the notification system applies the policy for delivering notifications concerning the content followed by the user that was updated. The notification system registers to receive information about updates to the content followed by the user as well as new events on the communication system. In response to identifying updates to content related to the content followed by the user that was updated from the received information, a summary concerning the updates to the content followed by the user and the related content is (Continued)

then generated. A notification is then delivered to the user containing the generated summary in a manner consistent with the policy.

16 Claims, 4 Drawing Sheets

(51) Int. Cl.
*H04L 12/58* (2006.01)
*G06Q 50/00* (2012.01)

(56) References Cited

U.S. PATENT DOCUMENTS

| | | |
|---|---|---|
| 2013/0167034 A1 | 6/2013 | Ickman et al. |
| 2015/0019654 A1 | 1/2015 | Wheeler et al. |
| 2016/0110333 A1 | 4/2016 | Brunn et al. |
| 2017/0134516 A1* | 5/2017 | Gutman .................. H04W 4/21 |

OTHER PUBLICATIONS

List of IBM Patents or Patent Applications Treated as Related, Aug. 22, 2019, pp. 1-2.

* cited by examiner

INTELLIGENTLY DELIVERING NOTIFICATIONS INCLUDING SUMMARY OF FOLLOWED CONTENT AND RELATED CONTENT

TECHNICAL FIELD

The present invention relates generally to social network services, and more particularly to intelligently delivering notifications that include a summary of the updates to the content followed by the user as well as the updates to the related content (e.g., content updated in the same container containing the content followed by the user that was updated).

BACKGROUND

A social network service is an online service, platform or site that focuses on building social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

In some social network services, users may receive notifications concerning content (e.g., photographs, documents, files, folders, albums, communities) followed by the user. For example, if the user makes a comment on a document they are following and the document is later updated, then the user would receive a notification concerning the update made to the document.

Users though may be overwhelmed with notifications on the content they are following. While the user may have some control over the type of notifications to be delivered to the user, such as via a settings panel, to attempt to address the overwhelming number of notifications being received, the user may end up opting out of receiving notifications that they find useful.

Unfortunately, there is not currently a means for intelligently grouping notifications of importance thereby allowing the users to view fewer notifications of interest without having to opt out of some kinds of notifications.

Furthermore, users typically only receive notifications concerning the activity on content they have interacted with (e.g., commented on a photograph in an album) and they are not notified of activities on other content in the same collection (e.g., comments on other photographs in the album) that may be of interest to them. As a result, users do not get a full view of activity within the collection (e.g., album).

Hence, there is not currently a means for intelligently grouping notifications of importance. Neither is there currently a means for delivering notifications that not only include updates to the content followed by the user but also the updates to other related content, such as other content in the same container or collection containing the followed content, that may be of interest to the user.

SUMMARY

In one embodiment of the present invention, a method for handling notifications comprises receiving indications of content to be followed by a user on a communication system. The method further comprises monitoring the content followed by the user for updates on the communication system. The method additionally comprises identifying an update to content out of the monitored content followed by the user. Furthermore, the method comprises applying a policy for delivering notifications concerning the updated content in response to identifying the update to content out of the monitored content followed by the user, where the policy comprises rules that govern how push and pull notifications are to be generated and delivered to the user, where the push notifications are notifications delivered to the user without being requested by the user, and where the pull notifications are notifications delivered to the user at the request of the user. Additionally, the method comprises registering to receive information about updates to the content followed by the user as well as about new events on the communication system in response to the policy indicating to delay sending a notification concerning the update to the user. In addition, the method comprises generating a summary concerning updates to the content followed by the user and content related to the content followed by the user in response to registering to receive information about updates to the content followed by the user as well as about new events on the communication system and in response to identifying updates to content related to the content followed by the user. The method further comprises delivering a notification in a manner consistent with the policy to the user containing the generated summary.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for handling notifications. In one embodiment of the present invention, a notification system receives indications of content to be followed by a user on a communication system (e.g., social networking system). For example, if a user comments on content (e.g., photograph), then it may be inferred that the user desires to follow that content. The notification system then monitors the content followed by the user for updates on the communication system. If the notification system identifies updates to content out of the monitored content followed by the user, then the notification system applies the policy for delivering notifications concerning the content followed by the user that was updated. A "policy," as used herein, refers to the rules that govern how notifications are to be generated and delivered to the user. The notification system registers to receive information about updates to the content followed by the user as well as about new events on the communication system. In response to identifying further updates to the content followed by the user (e.g., updates to photograph #1 followed by the user) and updates to content related to the content followed by the user that was updated (e.g., updates to photograph #2 that is in the same container as photograph #1 but not followed by the user) from the received information, a summary is generated. The summary includes a summary concerning the updates to the content followed by the user and the related content. A notification is then delivered to the user containing the generated summary in a manner consistent with the policy. In this manner, notifications may be intelligently grouped to be delivered to the user that not only include updates to the content followed by the user but also the updates to other related content, such as other content in the same container or collection containing the followed content, which may or may not be targeted for notification by the user. As a result, the user will be receiving fewer notifications thereby alleviating the overwhelming number of notifications received by the user. Furthermore, the user may be informed of updates not targeted for notification that are of interest to the user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
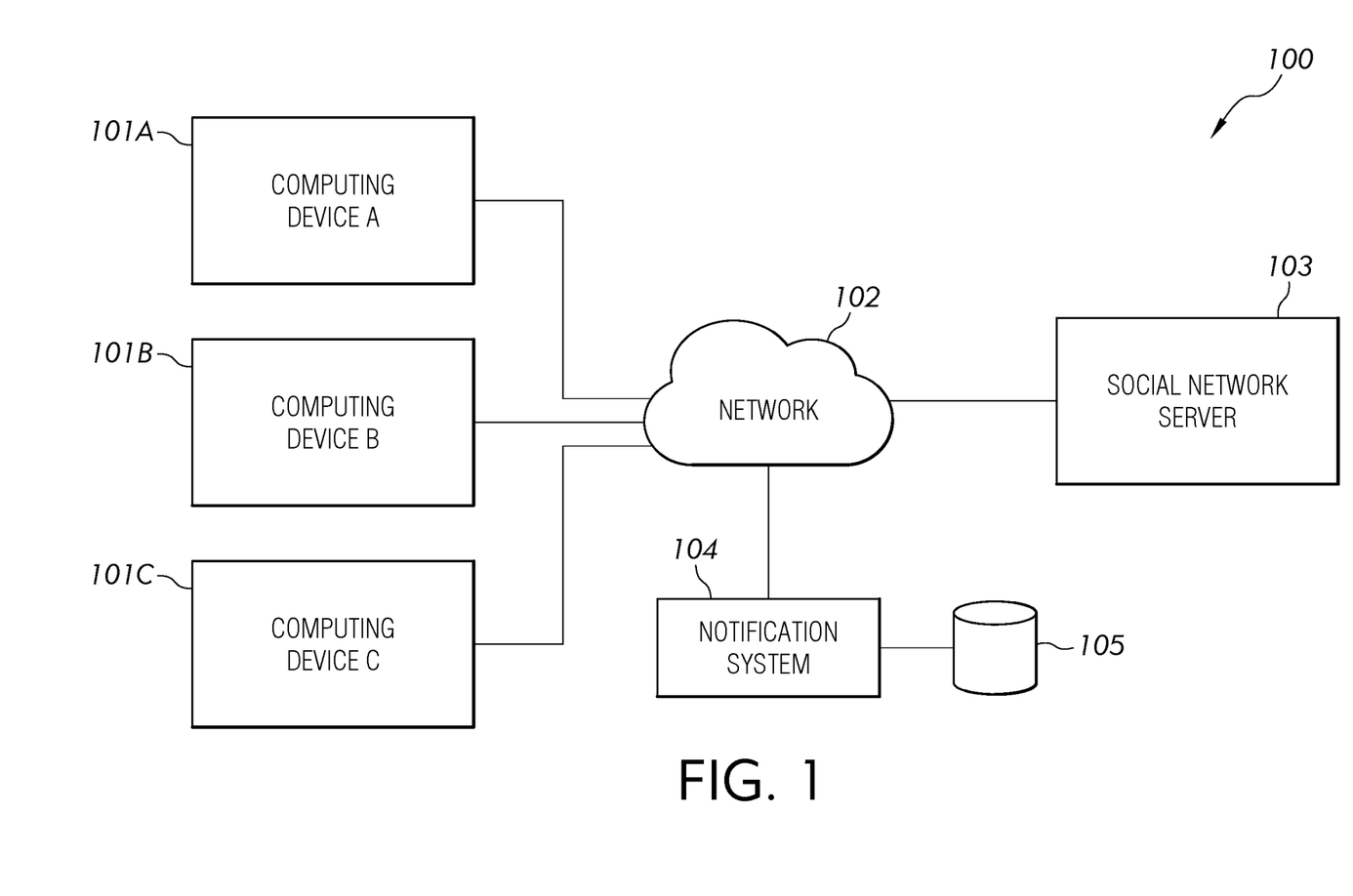
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using computing devices 101A-101C (identified as "Computing Device A," "Computing Device B," and "Computing Device C," respectively, in FIG. 1) to be involved in social network system 100. Computing devices 101A-101C may collectively or individually be referred to as computing devices 101 or computing device 101, respectively. Computing device 101 may be a portable computing unit, a Personal Digital Assistant (PDA), a smartphone, a laptop computer, a mobile phone, a navigation device, a game console, a desktop computer system, a workstation, an Internet appliance and the like. It is noted that both computing devices 101 and the users of computing devices 101 may be identified with element number 101.

Computing devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. While FIG. 1 illustrates a single social network server 103, it is noted for clarity that multiple servers may be used to implement the social networking and/or microblogging service.

System 100 further includes a notification system 104 connected to network 102 by wire or wirelessly. Notification system 104 is configured to intelligently group notifications of importance, such as grouping notifications of content followed by user 101 as well as content related to the followed content regardless of whether the related content would have triggered a notification themselves as discussed further below. A description of the hardware configuration of notification system 104 is provided below in connection with FIG. 2.

In one embodiment, system 100 includes a database 105 connected to notification system 104, where database 105 stores recent notifications that were delivered to user 101 or pending notifications that are ready to be delivered to user 101 as discussed further below.

System 100 is not to be limited in scope to any one particular network architecture. System 100 may include any number of computing devices 101, networks 102, social network servers 103, notification systems 104 and databases 105. Furthermore, in one embodiment, notification system 104 may be part of computing device 101 or social network server 103.

While FIG. 1 illustrates a social network system, the principles of the present invention are not to be limited in scope to delivering notifications in such a system. The principles of the present invention may be applied to any communication system (e.g., document management system, case management system, persistent chat system) with the ability to deliver notifications. A person of ordinary skill in the art would be capable of applying the principles of the present invention to such implementations. Further, embodiments applying the principles of the present invention to such implementations would fall within the scope of the present invention.

Figure 2:
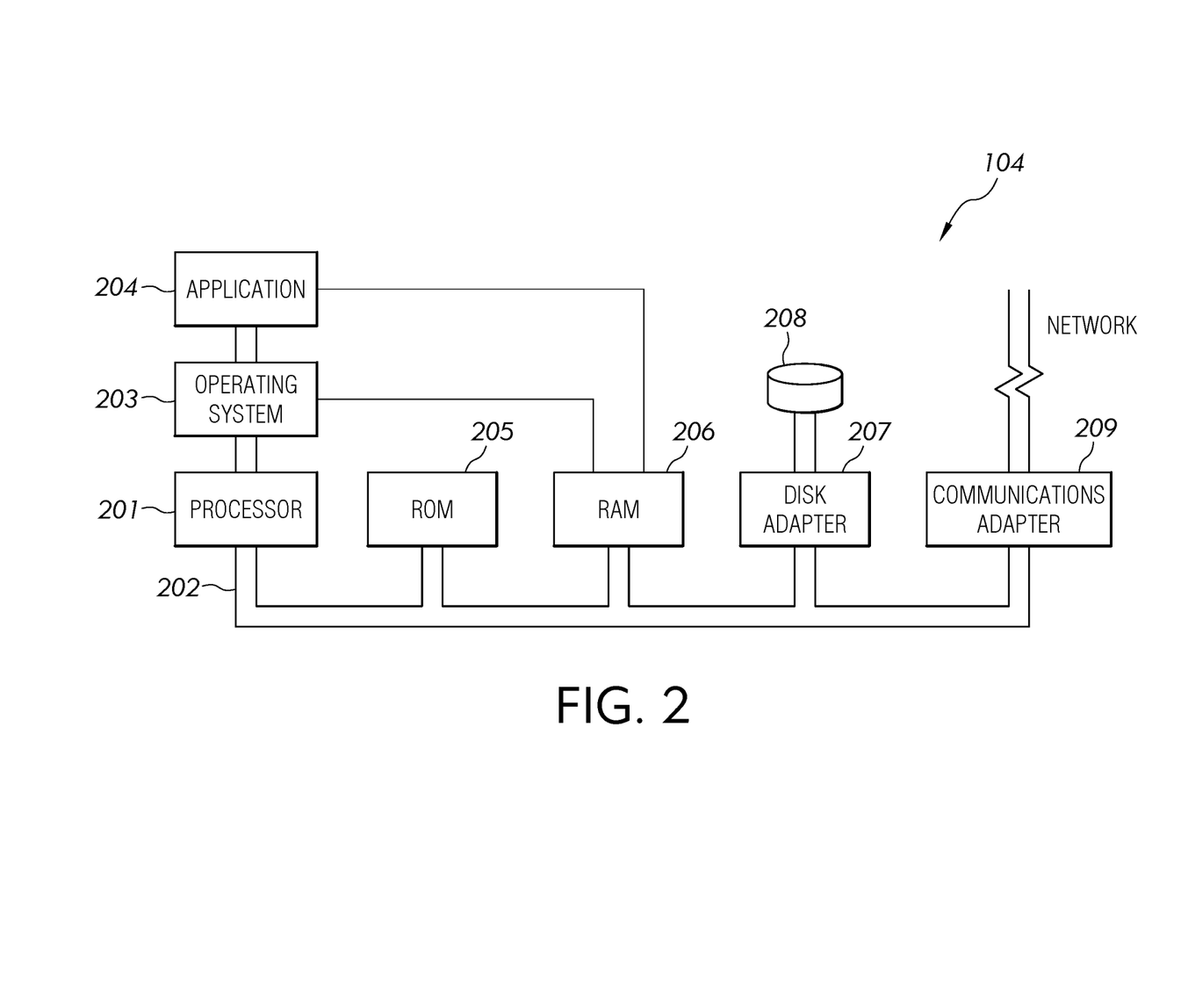
FIG. 2 illustrates a hardware configuration of a notification system in accordance with an embodiment of the present invention.

Referring now to FIG. 2, FIG. 2 illustrates a hardware configuration of notification system 104 (FIG. 1) which is representative of a hardware environment for practicing the present invention. Referring to FIG. 2, notification system 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for intelligently delivering notifications to users 101 that include a summary of the updates to the content followed by user 101 as well as updates to related content (e.g., content updated in the same container containing the content followed by the user that was updated) as discussed further below in association with FIG. 3. Furthermore, application 204 may include a program for delivering updated notifications to users 101 as discussed further below in association with FIG. 4.

Referring again to FIG. 2, read-only memory ("ROM") 205 is coupled to system bus 202 and includes a basic input/output system ("BIOS") that controls certain basic functions of notification system 104. Random access memory ("RAM") 206 and disk adapter 207 are also coupled to system bus 202. It should be noted that software components including operating system 203 and application 204 may be loaded into RAM 206, which may be notification system's 104 main memory for execution. Disk adapter 207 may be an integrated drive electronics ("IDE") adapter that communicates with a disk unit 208, e.g., disk drive. It is noted that the program for intelligently delivering notifications to users 101 that include a summary of the updates to the content followed by user 101 as well as updates to related content (e.g., content updated in the same container containing the content followed by the user that was updated), as discussed further below in association with FIG. 3, may reside in disk unit 208 or in application 204. Furthermore, it is noted that the program for delivering updated notifications to users 101, as discussed further below in association with FIG. 4, may reside in disk unit 208 or in application 204.

Notification system 104 may further include a communications adapter 209 coupled to bus 202. Communications adapter 209 interconnects bus 202 with an outside network (e.g., network 102 of FIG. 1) thereby allowing notification system 104 to communicate with computing devices 101 and social network server 103.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, users may be overwhelmed with notifications on the content they are following. While the user may have some control over the type of notifications to be delivered to the user, such as via a settings panel, to attempt to address the overwhelming number of notifications being received, the user may end up opting out of receiving notifications that they find useful. Unfortunately, there is not currently a means for intelligently grouping notifications of importance thereby allowing the users to view fewer notifications of interest without having to opt out of some kinds of notifications. Furthermore, users typically only receive notifications concerning the activity on content they have interacted with (e.g., commented on a photograph in an album) and they are not notified of activities on other content in the same collection (e.g., comments on other photographs in the album) that may be of interest to them. As a result, users do not get a full view of activity within the collection (e.g., album). Hence, there is not currently a means for intelligently grouping notifications of importance. Neither is there currently a means for delivering notifications that not only include updates to the content followed by the user but also the updates to other related content, such as other content in the same container or collection containing the followed content, that may be of interest to the user.

The principles of the present invention provide a means for intelligently grouping notifications to be delivered to the user that not only include updates to the content followed by the user but also the updates to other related content, such as other content in the same container or collection containing the followed content, that may be of interest to the user as discussed below in connection with FIG. 3.

Figure 3:
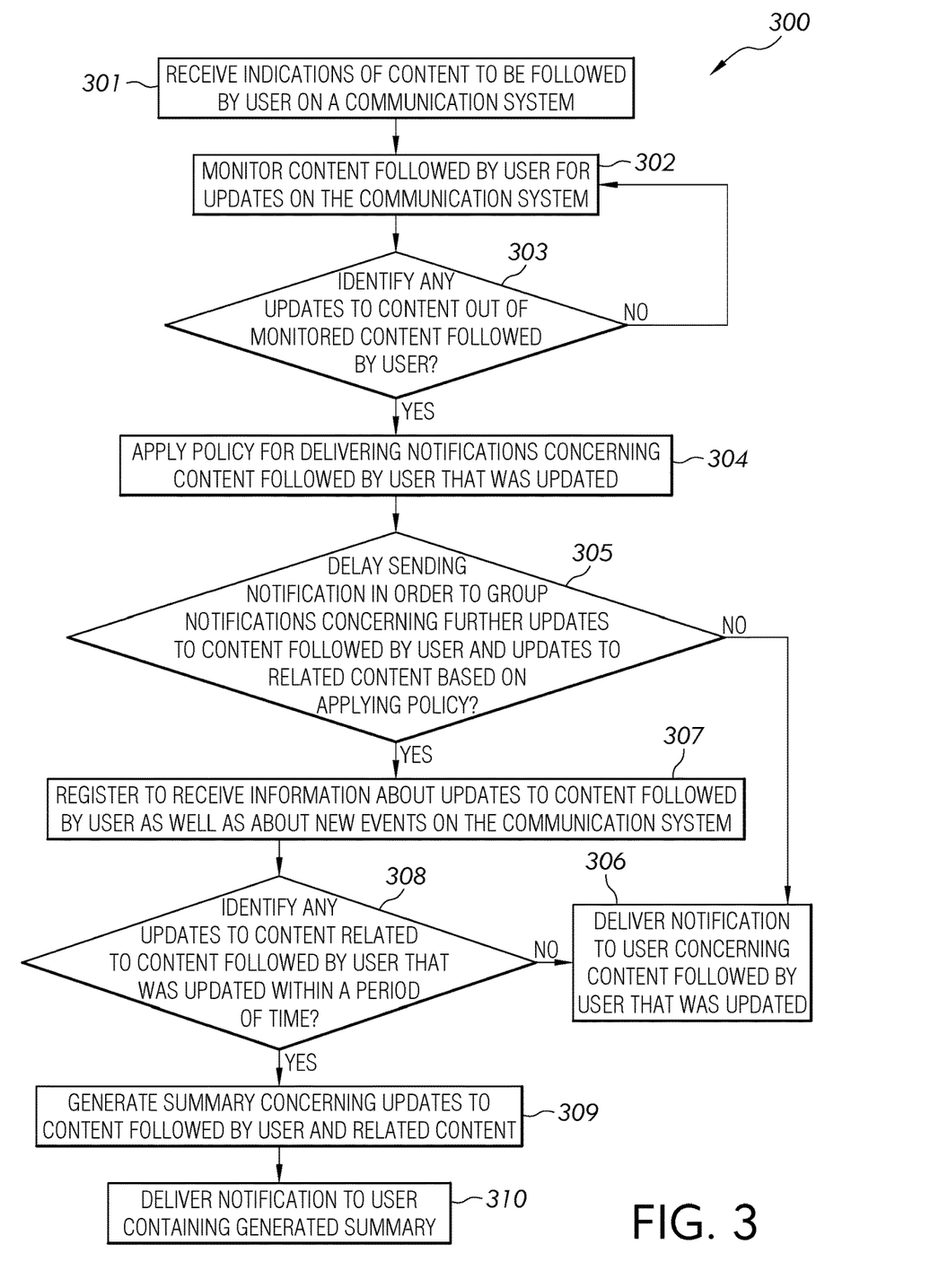
FIG. 3 is a flowchart of a method for intelligently delivering notifications to the user that not only include updates to the content followed by the user but also updates to other related content regardless of whether the related content would have triggered a notification themselves in accordance with an embodiment of the present invention.

FIG. 3 is a flowchart of a method 300 for intelligently delivering notifications to the user that not only include updates to the content followed by the user but also updates to other related content regardless of whether the related content would have triggered a notification themselves in accordance with an embodiment of the present invention.

Referring now to FIG. 3, in conjunction with FIGS. 1-2, in step 301, notification system 104 receives indications of content to be followed by user 101 on a communication system (e.g., social networking system). A "communication system," as used herein, refers to any system (e.g., document management system, case management system, persistent chat system) with the ability to deliver notifications. In one embodiment, such indications may be inferred based on the actions of user 101 monitored by notification system 104. For example, if user 101 commented on content (e.g., photographs, documents, files, folders, albums, communities), then it may be inferred that user 101 desires to follow that content. In another embodiment, such indications may be provided by user 101 to notification system 104, such as via a user interface of computing device 101.

In step 302, notification system 104 monitors the content followed by user 101 for updates on the communication system. For example, notification system monitors for updates to a document (e.g., file) followed by user 101.

In step 303, a determination is made by notification system 104 as to whether any of the monitored content followed by user 101 has been updated.

If there have been no updates to the monitored content followed by user 101, then notification system 104 continues to determine whether any of the monitored content followed by user 101 has been updated in step 303.

If, however, there have been updates to content out of the monitored content followed by user 101, then, in step 304, notification system 104 applies the policy for delivering notifications concerning the content followed by user 101 that was updated. A "policy," as used herein, refers to the rules that govern how notifications (both push and pull notifications, where a push notification refers to a notification delivered to user 101 without being requested by user 101, whereas, a pull notification refers to a notification delivered to user 101 at the request of user 101) are to be generated and delivered to user 101. The following provides a brief description of the various rules that may be implemented in a policy for delivering notifications concerning the content followed by user 101.

In one embodiment, the policy may include a rule to delay delivering a notification to user 101 for a designated period of time, which may be user established. In this manner, notification system 104 may be able to identify further notifications that could be grouped together so that they can be delivered in a batch rollup as opposed to being delivered separately. In this manner, user 101 will be able to receive fewer notifications thereby alleviating the overwhelming number of notifications received by user 101.

In one embodiment, the amount of time to delay delivering a notification is based on the degree of interaction user 101 has with the content followed by user 101 as well as the degree of urgency in delivering the notification. For example, the greater the degree of interaction user 101 has with the content followed by user 101, the shorter the delay in delivering the notification and vice-versa. In another example, the greater the degree of urgency in delivering the notification, the shorter the delay in delivering the notification and vice-versa. For instance, comments made on vacation photographs are deemed to not be urgent since, although important, they are likely to be part of a larger stream of comments on the photographs which could benefit from rolling up the associated notifications and are not likely to need immediate replies. Other aspects that may be used to determine the degree of urgency in delivering the notification include the geolocation of the user who commented on the content followed by user 101, the keywords used in updating the content followed by user 101 as well as how quickly after the content was created that it was updated. For example, if user 101 (e.g., user 101B) who updated the content followed by user 101 (e.g., user 101A) is geographically located in close proximity to user 101 (e.g., user 101A), then the notification may be delivered to user 101 (e.g., user 101A) quickly since it may be likely that user 101 (e.g., user 101A) would respond quickly. In another example, if the content is updated very soon after the content is created, then the notification may be delivered to user 101 quickly since it may be likely that user 101 would respond quickly.

In one embodiment, if there are no further updates during the predetermined time to delay delivering the notification, then the notification may proceed to be delivered. If, however, there are other updates to the content followed by user 101, notification system 104 may further delay again to deliver the notification to wait for further updates prior to delivering the notification. For example, if multiple updates from multiple users 101 have been received, notification system 104 may extend the delay time before delivering the notification.

In one embodiment, the policy may indicate to delay delivering notifications to user 101 in response to user 101 being unavailable. These notifications may be delayed until user 101 is available once again. In one embodiment, the availability of user 101 may be determined based on whether user 101 is offline. For example, if notification system 104 determines that user 101 is offline and away from his/her computing device 101 on which user 101 receives a notification, then all notifications will be delayed until user 101 is online again. By delaying the sending of notifications while user 101 will not be available, notifications can be efficiently grouped so as to limit the number of notifications being sent to user 101.

Furthermore, notifications may be delayed to be delivered to user 101 in order to identify content related to the content followed by the user, including content that is not targeted for notification by user 101. "Related content," as used herein, refers to content within the same container or collection as the content followed by user 101. For example, if a user 101 comments on document X and then later a user 101 comments on document Y followed by user 101 (e.g., user 101A), then even though the comment on document X would not normally cause a notification to be sent to user 101 (e.g., user 101A) since user 101 (e.g., user 101A) is not following document X, a notification may be sent to user 101 (e.g., user 101A) that includes the actions performed on both documents X and Y since these documents are in the same container or collection (e.g., folder, album), such as album Z. For instance, user 101 (e.g., user 101A) may receive a notification "comments were made on document X and document Y in album Z" despite not following document X. The end user 101 (e.g., user 101A) might never have received a notification for the comment on document X, but because it is located in the same container or collection as document Y followed by user 101, notification system 104 included the actions performed on document X in the notification since notification system 104 was going to send a notification to user 101 (e.g., user 101A) regarding the actions performed on document Y anyway.

Referring now to step 305, a determination is made by notification system 104 as to whether to delay sending a notification concerning the update in order to group notifications concerning further updates to the content followed by user 101 and updates to the related content based on applying the policy.

If the policy indicates to not delay sending a notification concerning the update, then, in step 306, notification system 106 delivers the notification to user 101 concerning the content followed by user 101 that was updated. In one embodiment, the decision on whether to delay or deliver the notification is based on a variety of factors, including the capabilities of computing device 101 as well as the ability to update existing notifications as discussed further below in connection with FIG. 4.

If, however, the policy indicates to delay sending a notification concerning the update, then, in step 307, notification system 104 registers (registered listener) to receive information about updates to content followed by user 101 (e.g., updates to photographs followed by user 101) as well as about new events (e.g., updates, such as likes, comments, etc., on photographs not followed by user 101) on the communication system for a period of time to identify further updates to the content followed by user 101 and updates to the content related to the content followed by user 101 that was updated. In one embodiment, the period of time corresponds to the "delay period" established by the policy. Notification system 104 registers to receive information about updates to content followed by user 101 as new updates may be identified and added to the notification that is ultimately delivered to user 101. Furthermore, notification system 104 registers to review information about new events as such new events may include updates to content that is related to the content followed by user 101.

In one embodiment, in response to being notified of new or updated content, notification system 104 searches a local database 105 or a graph (described below) for recent or pending notifications to identify those that should be amended, updated or supplemented.

In one embodiment, notification system 104 maintains a graph of updates to content (e.g., photographs, documents, files, folders, albums, communities). In one embodiment, such content is from the same hierarchy. For example, content may be mapped to a hierarchical graph, where content with a commonality amongst each other (e.g., similar subject matter, same container) are located in the same hierarchy or level. In one embodiment, notification system 104 utilizes natural language processing to identify similar subject matter among the content. In another embodiment, notification system 104 identifies all the content within the same container or collection and maps that content to the same hierarchy or level.

In one embodiment, notification system 104 marks the updates in the graph when viewed by user 101. In one embodiment, notification system 104 queries the graph for updates which not been viewed by user 101 from a particular hierarchy. Those updates which have not yet been viewed by user 101 are used by notification system 104 to generate a notification to be delivered to user 101 that informs user 101 regarding these updates, which may include updates to content that would not normally be targeted for notification by user 101.

In step 308, a determination is made by notification system 104 as to whether it identifies any updates to content related to the content followed by user 101 that was updated from the received information (from the information notification system 104 registered to receive in step 307) within a period of time. In one embodiment, the period of time corresponds to the "delay period" established by the policy.

If notification system 104 did not identify any updates to the content related to the content followed by user 101 that was updated within the period of time, then notification system 106 delivers the notification to user 101 concerning the content followed by user 101 that was updated in step 306. In one embodiment, the notification also includes the new updates to the content followed by user 101 that was received after notification system 104 registers to receive information in step 307.

If, however, notification system 104 identified updates to the content related to the content followed by user 101 that was updated within the period of time, then, in step 309, notification system 104 generates a summary concerning the updates to the content followed by user 101 and the related content. In one embodiment, the summary also includes the new updates to the content followed by user 101 that was received after notification system 104 registers to receive information in step 307.

In one embodiment, notification system 104 employs analytics to generate keywords to be used in the summary concerning the updates to the content followed by user 101 and the related content. These keywords are used to obtain the attention of user 101 to ensure user 101 does not miss updates important to user 101. In one embodiment, keywords may be determined using natural language processing by identifying words which appear multiple times in both the content followed by user 101 and the related content. For example, if a user 101A is sharing vacation photos from a ski trip to Utah, comments from users 101B, 101C may mention "Utah" and "skiing" respectively on different photos. The notification about the group of updates to user 101A, who may not be following all the photos, would then be automatically tagged with "Utah" and "skiing" when it is delivered to user 101A, even though those words may appear in different comments on separate photos, some of which may not be directly followed by the user receiving the notification. Furthermore, utilizing stemming and synonyms and other ontological techniques can be applied to find summarization keywords from among the words in the content followed by user 101 and the related content.

In one embodiment, the summary includes the types of updates. For example, the summary may state "3 likes, 5 comments, 2 new items created" so that user 101 can see at a glance what type of updates were made inside the container. In one embodiment, a detailed summary may be provided which includes a description of the events/actions performed on the content grouped together. For example, if there was a file entry with 2 likes, 5 comments and 2 updates, then the folder entry would only be listed once with a list of users who liked, the dates and authors of the updates and the new comments listed chronologically, even though the user receiving the notification may only be following a single item in the container.

In step 310, notification system 104 delivers the notification to user 101 containing the generated summary.

In this manner, notifications may be intelligently grouped to be delivered to the user that not only include updates to the content followed by the user but also the updates to other related content, such as other content in the same container or collection containing the followed content, which may or may not be targeted for notification by the user. As a result, the user will be receiving fewer notifications thereby alleviating the overwhelming number of notifications received by the user. Furthermore, the user may be informed of updates not targeted for notification that are of interest to the user.

Once a notification is delivered to user 101, further updates to the content specified in the delivered notification may occur. In such a situation, user 101 may be informed of these updates as discussed below in connection with FIG. 4.

Figure 4:
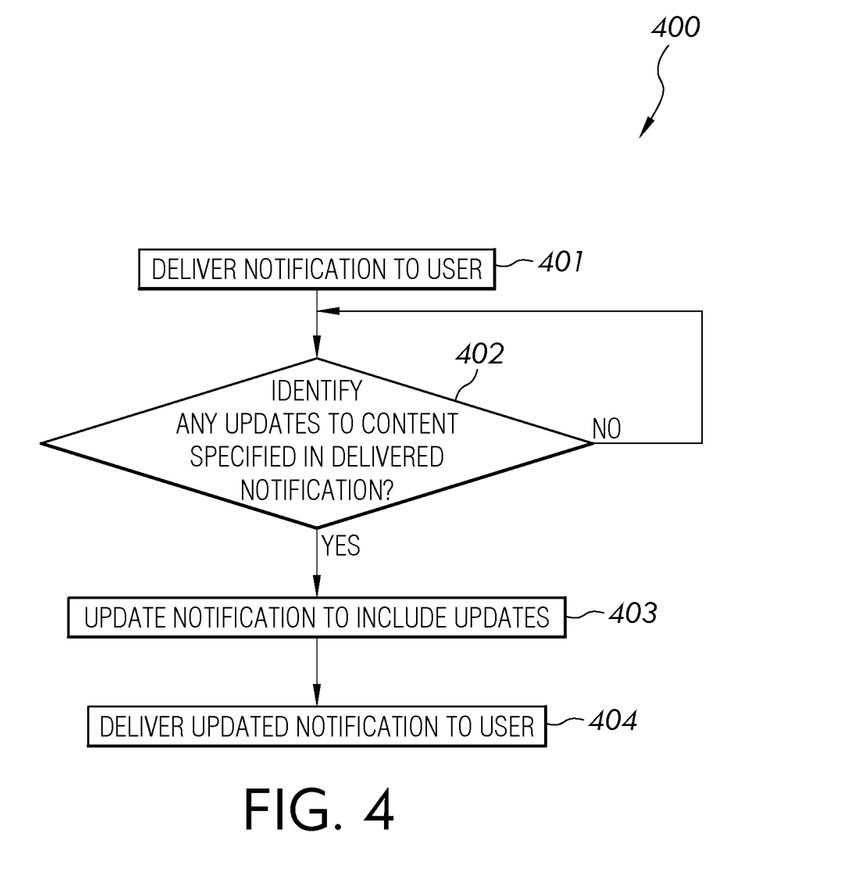
FIG. 4 is a flowchart of a method for delivering updated notifications in accordance with an embodiment of the present invention.

FIG. 4 is a flowchart of a method 400 for delivering updated notifications in accordance with an embodiment of the present invention.

Referring to FIG. 4, in conjunction with FIGS. 1-3, in step 401, notification system 104 delivers a notification to user 101, such as in step 306 or in step 310.

In step 402, a determination is made by notification system 104 as to whether it received any updates to the content specified in the delivered notification, including both the content followed by user 101 as well as the related content. In one embodiment, notification system 104 identifies updates to content in the same manner as discussed above in connection with method 300, such as in steps 307 and 308.

If there are no updates to the content specified in the delivered notification, then notification system 104 continues to determine whether it identifies any updates to the content specified in the delivered notification in step 402.

If, however, notification system 104 identified an update to the content specified in the delivered notification, then, in step 403, notification system 104 updates the notification to include these updates. For example, suppose that the delivered notification included a notification concerning an update to a specific photograph (e.g., photograph #1). If an update to that photograph occurred after delivery of the notification (e.g., comment #3 made to photograph #1), then the notification is updated to include that update (e.g., comment #3 made to photograph #1).

In step 404, notification system 104 delivers the updated notification to user 101.

In one embodiment, method 400 may be utilized for updating pending notifications, referring to those notifications that are prepared to be delivered to user 101 but have not yet officially been delivered. In one embodiment, such pending notifications may be stored in a queue, which may be located in a storage unit (e.g., memory 206, disk unit 208) of notification system 104.

For example, in one embodiment, notification system 104 queries the graph of updates to content (discussed above) to determine if there are pending notifications for the user which specify the updated content. If so, notification system 104 updates the record of the pending notification.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for handling notifications, the computer program product comprising a computer readable storage medium having program code embodied therewith, the program code comprising programming instructions for:

receiving indications of content to be followed by a user on a communication system;

monitoring said content followed by said user for updates on said communication system;

identifying an update to content out of said monitored content followed by said user;

applying a policy for delivering notifications concerning said updated content in response to identifying said update to content out of said monitored content followed by said user, wherein said policy comprises rules that govern how push and pull notifications are to be generated and delivered to said user, wherein said push notifications are notifications delivered to said user without being requested by said user, wherein said pull notifications are notifications delivered to said user at the request of said user;

determining whether to delay sending a notification concerning an update in order to group notifications concerning said updates to said content followed by said user and updates to related content based on applying said policy;

delaying sending said notification to said user concerning said update in order to identify content related to said content followed by said user including content not targeted for notification by said user, wherein said related content comprises content within a same container or collection as said content followed by said user;

searching a local database or a graph for recent or pending notifications to identify those that should be amended, updated or supplemented in response to being notified of new or updated content;

generating a summary concerning said updates to said content followed by said user and content related to said content followed by said user as well as about new events on said communication system and in response to identifying updates to content related to said content followed by said user; and delivering a notification in a manner consistent with said policy to said user containing said generated summary;

wherein said policy indicates a period of time to delay delivering said notification to said user based on a degree of interaction said user has with said content followed by said user and a degree of urgency n delivering said notification, wherein the greater said degree of interaction said user has with said content followed by said user, the shorter said delay in delivering said notification and vice-versa.

2. The computer program product as recited in claim 1, wherein the program code further comprises the programming instructions for:

registering to receive information about updates to said content followed by said user as well as about new events on said communication system for a period of time to identify further updates to said content followed by said user and updates to content related to said contents followed by said user that was updated, wherein said period of time corresponds to a delay period established by said policy corresponding to the amount of time in delaying said sending of said notification to said user concerning said updates.

3. The computer program product as recited in claim 1, wherein the program code further comprises the programming instructions for:

delaying sending said notification to said user concerning said update for a user-designated period of time in order to group notifications to be delivered in a batch rollup concerning further updates to said content followed by said user and updates to content related to said content followed by said user.

4. The computer program product as recited in claim 1, wherein the greater said degree of urgency in delivering said notification, the shorter said delay in delivering said notification and vice-versa.

5. The computer program product as recited in claim 1, wherein said policy indicates to delay delivering said notification to said user in response to said user being unavailable and to deliver said notification to said user once said user is available once again, wherein said availability of said user is determined based on whether said user is offline.

6. The computer program product as recited in claim 1, wherein the program code further comprises the programming instructions for:

mapping content to a hierarchical graph, wherein content with a commonality amongst each other are located in a same hierarchy;

marking updates to said content in said hierarchical graph; and querying said graph for updates which have not been viewed by said user from a particular hierarchy, wherein those updates which have not yet been viewed by said user are used to generate a notification to be delivered to said user that informs said user regarding these updates.

7. The computer program product as recited in claim 1, wherein said related content is content not targeted for notification by said user.

8. The computer program product as recited in claim 1, wherein the program code further comprises the programming instructions for:

identifying keywords to be added to said summary by identifying words which appear multiple times in both said content followed by said user and said related content using natural language processing.

9. A system, comprising:

a memory for storing a computer program for handling notifications; and a processor connected to said memory, wherein said processor is configured to execute the program instructions of the computer program comprising:

receiving indications of content to be followed by a user on a communication system;

monitoring said content followed by said user for updates on said communication system;

identifying an update to content out of said monitored content followed by said user;

applying a policy for delivering notifications concerning said updated content in response to identifying said update to content out of said monitored content followed by said user, wherein said policy comprises rules that govern how push and pull notifications are to be generated and delivered to said user, wherein said push notifications are notifications delivered to said user without being requested by said user, wherein said pull notifications are notifications delivered to said user at the request of said user;

determining whether to delay sending a notification concerning an update in order to group notifications concerning said updates to said content followed by said user and updates to related content based on applying said policy;

delaying sending said notification to said user concerning said update in order to identify content related to said content followed by said user including content not targeted for notification by said user, wherein said related content comprises content within a same container or collection as said content followed by said user;

searching a local database or a graph for recent or pending notifications to identify those that should be amended, updated or supplemented in response to being notified of new or updated content;

generating a summary concerning said updates to said content followed by said user and content related to said content followed by said user as well as about new events on said communication system and in response to identifying updates to content related to said content followed by said user; and delivering a notification in a manner consistent with said policy to said user containing said generated summary;

wherein said policy indicates a period of time to delay delivering said notification to said user based on a degree of interaction said user has with said content followed by said user and a degree of urgency in delivering said notification, wherein the greater said degree of interaction said user has with said content followed by said user, the shorter said delay in delivering said notification and vice-versa.

10. The system as recited in claim 9, wherein the program instructions of the computer program further comprise:

registering to receive information about updates to said content followed by said user as well as about new events on said communication system for a period of time to identify further updates to said content followed by said user and updates to content related to said contents followed by said user that was updated, wherein said period of time corresponds to a delay period established by said policy corresponding to the amount of time in delaying said sending of said notification to said user concerning said updates.

11. The system as recited in claim 9, wherein the program instructions of the computer program further comprise:

delaying sending said notification to said user concerning said update for a user-designated period of time in order to group notifications to be delivered in a batch rollup concerning further updates to said content followed by said user and updates to content related to said content followed by said user.

12. The system as recited in claim 9, wherein the greater said degree of urgency in delivering said notification, the shorter said delay in delivering said notification and vice-versa.

13. The system as recited in claim 9, wherein said policy indicates to delay delivering said notification to said user in response to said user being unavailable and to deliver said notification to said user once said user is available once again, wherein said availability of said user is determined based on whether said user is offline.

14. The system as recited in claim 9, wherein the program instructions of the computer program further comprise:

mapping content to a hierarchical graph, wherein content with a commonality amongst each other are located in a same hierarchy;

marking updates to said content in said hierarchical graph; and querying said graph for updates which have not been viewed by said user from a particular hierarchy, wherein those updates which have not yet been viewed by said user are used to generate a notification to be delivered to said user that informs said user regarding these updates.

15. The system as recited in claim 9, wherein said related content is content not targeted for notification by said user.

16. The system as recited in claim 9, wherein the program code further comprises the programming instructions for:

identifying keywords to be added to said summary by identifying words which appear multiple times in both said content followed by said user and said related content using natural language processing.

* * * * *